US007710961B2

(12) United States Patent
Miller et al.

(10) Patent No.: US 7,710,961 B2
(45) Date of Patent: May 4, 2010

(54) SYSTEM AND METHOD FOR SENDING PACKETS OVER A COMPUTER NETWORK

(76) Inventors: C. Kenneth Miller, 75 White Ave., Concord, MA (US) 01742; Thomas Andresen, 53 Lackey St., Westboro, MA (US) 01581; Thomas Gardner, 52 Barbara Jean St., Grafton, MA (US) 01519; Craig Michelson, 60 Grey Cliff Rd., Brighton, MA (US) 02135; Kenneth Cates, 47 Ackerman St., Salem, NH (US) 03079; Marc White, 315 Concord Rd., Wayland, MA (US) 01778; Kary Robertson, 75 White Ave., Newburyport, MA (US) 01950

( * ) Notice: Subject to any disclaimer, the term of this patent is extended or adjusted under 35 U.S.C. 154(b) by 973 days.

(21) Appl. No.: 10/957,535

(22) Filed: Oct. 1, 2004

(65) Prior Publication Data

US 2005/0100016 A1      May 12, 2005

Related U.S. Application Data

(63) Continuation of application No. 09/364,761, filed on Jul. 30, 1999, now Pat. No. 6,873,627, and a continuation-in-part of application No. 09/274,574, filed on Mar. 23, 1999, now Pat. No. 6,625,652, which is a continuation-in-part of application No. 09/012,386, filed on Jan. 23, 1998, now Pat. No. 6,151,696, which is a continuation-in-part of application No. 08/585,948, filed on Jan. 16, 1996, now Pat. No. 5,727,002, which is a continuation-in-part of application No. 08/375,493, filed on Jan. 19, 1995, now Pat. No. 5,553,083.

(51) Int. Cl.
*H04L 12/28* (2006.01)

(52) U.S. Cl. .................. 370/390; 370/392; 370/432; 709/203

(58) Field of Classification Search ................ None
See application file for complete search history.

(56) References Cited

U.S. PATENT DOCUMENTS 4,491,947 A    1/1985    Frank (Continued)

FOREIGN PATENT DOCUMENTS

EP          0303830 A2    2/1989

(Continued)

OTHER PUBLICATIONS

Draft Standard 802.1E, System Load Protocol, ANSI and Joint Technical Committee of the ISO and the IEC, 1990, 64 pages.

(Continued)

*Primary Examiner*—Jayanti K Patel
*Assistant Examiner*—Jung Park
(74) *Attorney, Agent, or Firm*—Perkins Coie LLP

(57) ABSTRACT

The benefits of a multicast-enabled network are realized by a flexible, easy to deploy, software-based solution that does not require reconfiguring of network routers. Systems and methods that implement this solution can perform as follows. A packet is received that was sent by a sender to at least one receiver, and the packet includes a parameter relating to a multicast announce address. A forwarding rules set is associated with the packet if the parameter has a defined value. This forwarding rules set is used to determine whether any of the at least one destination addresses included in the packet corresponds to one of the receivers that has a receiver format that must be converted. In addition, the forwarding rules set defines when a packet should be converted from a sender format to a receiver format before forwarding the packet. The packet is converted from the sender format to the receiver format for each destination address identified as requiring conversion, and forwarded in accordance with the forwarding rules set.

17 Claims, 10 Drawing Sheets

U.S. PATENT DOCUMENTS

| | | | |
|---|---|---|---|
| 4,493,021 A | 1/1985 | Agrawal et al. | |
| 4,554,656 A | 11/1985 | Budrikis et al. | |
| 4,642,758 A | 2/1987 | Teng | |
| 4,759,015 A | 7/1988 | Takai et al. | |
| 4,888,767 A | 12/1989 | Furuya et al. | |
| 4,914,654 A | 4/1990 | Matsuda et al. | |
| 4,937,819 A | 6/1990 | King | |
| 4,979,165 A | 12/1990 | Dighe et al. | |
| 5,070,453 A | 12/1991 | Duffany | |
| 5,109,384 A | 4/1992 | Tseung | |
| 5,296,936 A | 3/1994 | Pittas et al. | |
| 5,297,143 A | 3/1994 | Fridrich et al. | |
| 5,404,505 A | 4/1995 | Levinson | |
| 5,452,450 A | 9/1995 | Delory | |
| 5,491,691 A | 2/1996 | Shtayer et al. | |
| 5,519,834 A | 5/1996 | Kamerman et al. | |
| 5,553,083 A | 9/1996 | Miller | |
| 5,572,678 A | 11/1996 | Homma et al. | |
| 5,619,689 A | 4/1997 | Kelly | |
| 5,696,764 A | 12/1997 | Soumiya et al. | |
| 5,727,002 A | 3/1998 | Miller et al. | |
| 5,748,736 A | 5/1998 | Mittra | |
| 5,752,003 A | 5/1998 | Hart | |
| 5,920,701 A | 7/1999 | Miller et al. | |
| 6,002,852 A | 12/1999 | Birdwell et al. | |
| 6,078,954 A | 6/2000 | Lakey et al. | |
| 6,085,251 A | 7/2000 | Fabozzi, II | |
| 6,101,187 A | 8/2000 | Cukier et al. | |
| 6,115,379 A * | 9/2000 | Flanders et al. | 370/392 |
| 6,131,123 A * | 10/2000 | Hurst et al. | 709/238 |
| 6,151,696 A | 11/2000 | Miller et al. | |
| 6,163,810 A * | 12/2000 | Bhagavath et al. | 709/238 |
| 6,181,697 B1 * | 1/2001 | Nurenberg et al. | 370/390 |
| 6,189,039 B1 | 2/2001 | Harvey et al. | |
| 6,259,701 B1 | 7/2001 | Shur et al. | |
| 6,397,255 B1 | 5/2002 | Nurenberg et al. | |
| 6,453,438 B1 | 9/2002 | Miller et al. | |
| 6,483,832 B1 | 11/2002 | Civanlar et al. | |
| 6,567,929 B1 | 5/2003 | Bhagavath et al. | |
| 6,625,652 B1 | 9/2003 | Miller et al. | |
| 6,873,627 B1 | 3/2005 | Miller et al. | |

FOREIGN PATENT DOCUMENTS

| | | |
|---|---|---|
| EP | 0437072 A1 | 7/1991 |
| EP | 0552794 A2 | 7/1993 |
| EP | 0632671 A2 | 1/1995 |
| EP | 0654921 A1 | 5/1995 |
| WO | WO-9113503 A1 | 9/1991 |
| WO | WO-9526088 A1 | 9/1995 |

OTHER PUBLICATIONS

Comer, Internetworking with TCP/IP, vol. I, Principles, Protocols, and Architecture, Second Edition, Prentice Hall, 1991, Chapter 23, pp. 377-390.

Waters, A., et al, "Broadcast File Distribution Protocols for Satellite Networks," IEEE Telecommunications Conf., 1989, pp. 133-138.

Henriksen, E., et al, "A Transport Protocol Supporting Multicast File Transfer Over Satellite Links," International Phoenix Conf. on Computers and Communications, 1992, pp. 590-596.

Shacham, "Multipoint Communications by Hierarchically Encoded Data," INFOCOM '92, pp. 2107-2114.

Shachum, "Multicast Routing of Hierarchical Date", ICC '92, pp. 1217-1221.

International Search Report for PCT/US96/00634, Mailed on Dec. 5, 1996, 11 pgs.

Doshi et al., "Error and Flow Control Performance of a High Speed Protocol," IEEE Transactions on Communications, vol. 41, No. 5, May 1993, pp. 707-720.

Sabnani et al., "Multidestination Protocols for Satellite Broadcast Channels," IEEE Transactions on Communications, vol. COM-33, No. 3, Mar. 1985, pp. 232-240.

Wang et al., "Optimal Adaptive Multireceiver ARQ Protocols," IEEE Transactions on Communications, vol. 41, No. 12, Dec. 1993, pp. 1816-1829.

Paul et al., "Multicast Transport Protocols for High Speed Networks," 1994 International Conference on Network Protocols, Oct. 1994, pp. 4-14.

Derring, "Host Extensions for IP Multicasting," Stanford University, Aug. 1989, pp. 1-17.

Cho et al., "Continuous Multidestinatioin ARQ Schemes for High Error-Rate Channels," Electronics Letters, vol. 24, No. 11, May 1988, pp. 694-695.

Invitation to Pay Additional Fees and Partial International Search Report for PCT/US96/00634; Mailed on Jul. 22, 1996; 6 pages.

Quernheim et al., "A New ARQ-Scheme for Multicast Satellite Communication," 3rd European Conference on Satellite Communications, Nov. 1993, pp. 11-15.

"The Internet Multicasting Service," Release 1.0, v94, n2, p. 10(6), Feb. 18, 1994, Dialog printout.

"IBM Japan Develops New Communication Protocol", news article, Nov. 3, 1995, 3 pgs.

Towsley, "An Analysis of a Point-to-Multipoint Channel Using a Go-Back-N Error Control Protocol," IEEE Transactions on Communications, vol. COM-33, No. 3, Mar. 1985, pp. 282-285.

Cheriton et al., "VMTP as the Transport Layer for High-Performance Distributed Systems," IEEE Communications Magazine, Jun. 1989, pp. 37-44.

Cheriton, "VMTP: Versatile Message Transaction Protocol," RFC 1045, Feb. 1988, 99 pgs.

Braudes et al., "Requirements for Multicast Protocols," RFC 1458, May 1993, 16 pgs.

Kessler et al., "A Primer on Internet and TCP/IP Tools," RFC 1739, Dec. 1994, 37 pgs.

Witzke et al., "Tuning Computer Communications Networks and Protocols", 10th Int'l. Phoenix Conf. on Computers and Communications, Mar. 1991 IEEE, pp. 573-579.

Narayan, "Reliable Multi-Destination Transfer of Data in a Local Area Network", 10th Int'l. Phoenix Conf. on Computers and Communications, Mar. 1991, pp. 681-687.

Sparreboom et al., "Data Broadcasting with Feedback for Wireless LANs," Globecom '95, Nov. 1995, pp. 345-349.

Jones et al., "Protocol Design for Large Group Multicasting: The Message Distribution Protocol," vol. 14, No. 5, Jun. 1991, pp. 287-297.

Daka et al., "A High Performance Broadcast File Transfer Protocol," ACM SIGCOMM Computer Communication Review, vol. 18, Issue 4, Aug. 1988, pp. 274-281.

Bhagwat et al., "Effect of Topology on Performance of Reliable Multicast Communication", INFOCOM, 94, Dec. 1994, pp. 602-609.

International Organization for Standardization (ISO) and the International Electrotechnical Commission (IEC). "ISO/IEC CD 8802-1E—Information Technology—Telecommunications and Information Exchange Between Systems—Local Area Networks—Part 1: General Introduction—Section E: System Load Protocol," Mar. 25, 1990, 63 pgs.

Starburst White Paper, "Starburst MFTP—An Efficient, Scalable Method for Distributing Information Using IP Multicast," available at www.starburstcom.com/white.htm, 1997, pp. 1-6.

Ken Miller et al., "Starburst Multicast File Transfer Protocol (MFTP) Specification," IETF Internet draft at www.ierf.org, Apr. 1998, 58 pgs.

International Search Report for Application No. PCT/US97/15040; Mailed Dec. 18, 1997; 6 pages.

Obraczka, K., "Multicast transport protocols: a survey and taxonomy," IEEE Communications Magazine, vol. 36, No. 1, Jan. 1998, pp. 94-102.

Dang, W., "Reliable File Transfer in the Multicast Domain," ftp://ftp.hawaii.edu/paccom/imm-3.3/ Accessed Mar., Aug. 1993, 7 pgs.

Notice of Opposition Against European Patent EP 0 804 838, Aug. 21, 2002, 7 pgs.

Decision Revoking European Patent No. EP 0 804 838, Nov. 26, 2009, 35 pgs.

Miller et al., Information Disclosure Statement, U.S. Appl. No. 08/704,115, Dec. 17, 1996.

Tactix ReEngineering, "TRIView Manager" brochure, four pages, Dec. 17, 1996*.

* cited by examiner

| MULTICAST ADDRESS | RECEIVERS AT MULTICAST ADDRESS | FORWARDING FOR EACH RECEIVER | FORMAT OF RECEIVER |
|---|---|---|---|
| GROUP-A | RECEIVER-1 | RELAY-1 TO RECEIVER-1 | MULTICAST |
| | RECEIVER-2 | RELAY-1 TO RELAY-2 TO RECEIVER-2 | UNITICAST |
| | RECEIVER-3 | RELAY-1 TO RELAY-2 TO RECEIVER-3 | UNITICAST |
| | RECEIVER-4 | RELAY-1 TO RELAY-2 TO RECEIVER-4 | UNITICAST |
| | RECEIVER-5 | RELAY-1 TO RECEIVER-1 | MULTICAST |

Fig. 5

SYSTEM AND METHOD FOR SENDING PACKETS OVER A COMPUTER NETWORK

CROSS-REFERENCE TO RELATED CASES

This application is a continuation of U.S. application Ser. No. 09/364,761, filed Jul. 30, 1999, now U.S. Pat. No. 6,873,627 and a continuation-in-part of U.S. patent application Ser. No. 09/274,574, filed Mar. 23, 1999, now U.S. Pat. No. 6,625,652, which is continuation-in-part of U.S. patent application Ser. No. 09/012,386, filed Jan. 23, 1998, now U.S. Pat. No. 6,151,696, which is a continuation-in-part of U.S. patent application Ser. No. 08/585,948, filed Jan. 16, 1996, now U.S. Pat. No. 5,727,002, which is a continuation-in-part of U.S. patent application Ser. No. 08/375,493, filed Jan. 19, 1995, now U.S. Pat. No. 5,553,083 which is being re-examined as of Jun. 26, 1998 under U.S. Re-examination Control No. 90/005,028. Each of these patents and patent applications is incorporated by reference.

TECHNICAL FIELD

This invention generally relates to data transmission and to sending packets over a computer network. More particularly, it relates to a system and method for sending packets over a computer network where the sender and receiver of the packets operate using different formats, such as multicast and unicast.

BACKGROUND INFORMATION

Computer networks, such as wide area networks (WANs) using the Transmission Control Protocol/Internet Protocol (TCP/IP) protocol suite, can provide unicast, multicast, and broadcast services to allow communication between network participants such as a server node and one or more client nodes. IP supports the sending of data to broadcast addresses, which are delivered to all hosts on the network or subnetwork at the expense of creating traffic over the total network. IP also supports multicast technology to communicate over a computer network. The term "broadcast" refers to a server node sending information to all of the client nodes connected to the network. The term "multicast" refers to a server node sending information to a subset of all of the client nodes connected to the network.

Some information providers provide information electronically by broadcasting or multicasting the information from a server node at a central location to one or more client nodes at remote customer locations via a computer network to which the server and the clients are coupled. Computer networks and systems use several different protocols to accomplish reliable data distribution.

TCP/IP, one common protocol suite, presently is used with the Internet. The TCP part provides transport protocol functions to ensure that the total amount of bytes sent is received correctly at the other end. The IP part provides a routing mechanism. In addition, because TCP/IP is a routable protocol, the messages transmitted in accordance with TCP/IP contain the address of a destination network as well as a destination station. Thus, TCP/IP messages can be sent to multiple networks. Conventional TCP/IP reliable file transfer protocols support point-to-point (i.e., unicast) file distribution only. That is, packets are sent to each address in turn.

A protocol within the TCP/IP protocol suite, called User Datagram Protocol (UDP), may be used when reliable delivery of a message is not required (such as video and real-time audio traffic) and thus may offer bandwidth savings. However, because UDP provides no error checking or packet sequence checking, if UDP is used to send messages, then the application using UDP must provide the error checking and packet sequence checking functions.

Most packets today are sent as unicasts (one to one) or broadcasts (one to all). Unicasts have a destination IP address that points to a single recipient. Broadcasts generally have a destination address for all hosts on a specific subnet (a component of a larger network). Multicast is a one to many type of data transmission that permits a sender to transmit a message to multiple recipients at the same time. Multicast is similar to broadcasting, except that multicast generally implies sending information to a list of specific users (e.g., a subset of all possible recipients), whereas broadcast generally implies sending a message to all possible recipients.

One relevant difference between a multicast packet and a unicast (or broadcast) packet is that the destination IP address in a multicast packet refers to an address corresponding to a group of hosts, rather than a specific network or specific host. Thus, multicast traffic on a network can be distinguished from unicast and broadcast traffic by examining the destination IP address, which in a multicast packet identifies the specific multicast group for which an IP packet was sent. For example, if a sender wants to send data to a group of receivers, the sender need only send the data to the particular multicast group address associated with that group. Because receivers in a group can listen at that address for messages, these receivers can receive the packets and process the contents.

Multicast networking and the applications providing one to many services using multicast are becoming important because multicast networks enable applications to scale; that is, multicast enables the applications to service many users without overloading network and sender resources. Widespread usage of applications servicing many users generally is not possible without the scaling provided by efficient network services such as those provided by multicast.

One significant barrier to deployment of multicast, however, has been the reluctance of network operators to actually implement multicast in their network. This often is because it is risky to change networks in any way, for fear of any problems or downtime with the network. Networks already are critical to many businesses and are becoming even more important with time. Thus, network downtime can cost businesses millions of lost dollars and may even cost those responsible their job.

One prior art solution to this problem is known as tunneling. With tunneling, multicast packets are entirely encapsulated inside unicast packets (such as inside TCP) for traversal over parts of the network that do not support multicast. With tunneling, a multicast packet is sent point to point to the end of the tunnel, where the multicast packet is de-encapsulated. FIG. 1 is a simplified example of tunneling. In FIG. 1, a content source 10 (which is multicast enabled) wants to send a multicast message to a receiver (not shown)-located on the multicast network 12, but to get there the message must be sent over a non-multicast network 14. To accomplish this, a first router 13 encapsulates the entire multicast packet from source 10 inside a unicast packet. That is, the entire multicast packet, including the content and the source and destination addresses, is encapsulated inside a packet having a different format, such as unicast. The unicast packet is transmitted over the non-multicast network 14, then reaches a second router 13". This second router 13" then "strips away" the unicast information, leaving a multicast packet.

Tunneling has a couple of issues that make it non-advantageous to implement on existing networks. The first issue is that tunneling generally is implemented in routers, which requires the network operator to have to reconfigure the routers. Reconfiguring routers risks destabilization of the network. Moreover, if a network operator must reconfigure a router (which the operator generally is loath to do), the operator may simply choose to implement multicast.

Another limitation of tunneling is that it operates in a point to point (i.e., unicast) manner. Thus, in the example of FIG. 1, if the content source 10 wants to send multicast messages to fifty different receivers on the multicast network 12, the source 10 will require fifty different tunnels to be established, each tunnel requiring use of a router at each end. Because tunneling generally requires a fixed tunnel through the non-multicast part of the network, this limits the flexibility of such an approach. For example, there may be cascades of non-multicast parts of the network where the end device may want to split the traffic into multiple unicasts. The ultimate subnets may be multicast enabled, but the non-multicast portion is more complex than a simple point to point link.

Still another issue is one of efficiency. With tunneling, the total multicast packet is encapsulated inside of a unicast packet, resulting in two IP headers of overhead instead of just one, thereby increasing the bandwidth required. Thus, tunneling is very difficult, and sometimes not possible, to implement on certain networks.

SUMMARY OF THE INVENTION

Reliable multicast data transfer, such as that specified in the Multicast File Transfer Protocol (MFTP) offered by Starburst Communications Corp., of Concord, Mass., allows packets to be sent to several host recipients simultaneously. Reliable multicast saves bandwidth and provides error checking. A multicast group is the group of host recipients that simultaneously receive data via the reliable multicast data transfer. For example, with multicast, a data packet is sent to a participating router, and the router handles local distribution. Typical applications for reliable multicast data distribution include electronic software distribution, transmission of critical information to field offices, distribution of multimedia information to local servers, replication of web servers to the edges of networks for improved performance, and providing subscription based "push" information delivery to receivers who have signed up for a particular information service.

IP multicast groups are dynamic and can be set up and torn down in seconds. IP multicast session setup protocols that have been standardized support two basic group models for two basic multicast applications. One group model is the conferencing model, in which a host is "invited" to join a conference, and a many to many multicast group is set up. This conference can be a videoconference, a data conference, or some other type of conference. A second group model is the broadcast model. This is analogous to television broadcast, where events and their times and "channels" are continuously broadcast over a particular channel, much as is done on many cable TV systems. Any receiver seeing an event may join the group and receive the information, in a manner analogous to tuning a TV receiver to the channel desired. Both of these models assume that anyone can access the groups with no restriction. There is no knowledge of group membership in the one to many group model, and there may not be knowledge in the conference model.

In one aspect, it is an object of the present invention to extend the advantages of reliable multicast protocols, such as MFTP, to networks that are not yet multicast-enabled. It is another object of the present invention to provide a system and method for sending packets over a computer network that works in conjunction with a reliable multicast protocol such as MFTP.

It is yet another object of the present invention to provide a system and method for providing the benefits of multicast on a network without having to change their network and risk downtime. In many instances, certain parts of an organization's computer network, such as local area networks (LANs), inherently are multicast ready. Other parts of the network, such as the wide area network (WAN) portions, usually are not multicast ready. Because multicast often can provide the greatest benefit on a WAN, it would be advantageous to develop a way to use multicast on the WAN without having to change the network portion of the WAN.

Still another objective of the present invention is to overcome the difficulties associated with the prior art and provide a flexible, easy to deploy solution that provides the benefits of a multicast enabled network without incurring the risk of network destabilization. It is another objective of the invention to exploit the existing network capabilities most efficiently without requiring any change in the network infrastructure.

As described below, the objectives of the invention are accomplished in part by implementing a packet forwarding system that is resident on the application layer (i.e., layer 7 on the Open System Interconnection (OSI) standard for worldwide communications) of a server located between the sender and the receiver. A set of forwarding rules, such as a forwarding rules table, is configured at the server, enabling the server to translate received unicast, broadcast, or multicast packets into unicast, broadcast, or multicast packets as required.

Based on information provided in a protocol header in the packet, and in some embodiments on a configuration file provided by the user, the server converts, distributes, and/or delivers packets it receives. During conversion, a parameter provided in the packet sent by the sender, such as a parameter relating to a multicast announce address, is used by the forwarding table to make a decision as to whether and how to covert a packet. In some embodiments of the invention, such as those implemented in accordance with the MFTP reliable multicast protocol, the actual protocol headers are modified at the sender to comprise special fields related to the conversion of the packet.

In one aspect, the invention features a method for sending packets over a computer network, comprising (a) receiving a packet sent by a sender to at least one receiver, the packet comprising a parameter relating to a multicast announce address; (b) associating a forwarding rule set with the packet if the parameter has a defined value; (c) using the forwarding rules set to determine if any of the at least one destination addresses associated with the multicast announce address corresponds to a receiver that has a receiver format that must be converted, where the forwarding rules set defines when a packet should be converted from a sender format to a receiver format before forwarding the packet; (d) converting the packet from the sender format to the receiver format for each destination address identified in step (c) as requiring conversion; and (d) forwarding the packet in accordance with the forwarding rules set.

Embodiments according to this aspect of the invention can include the following features. The first forwarding set can be configured to be responsive to the addresses and formats of all senders and receivers on the computer network. The conversion from a sender format to a receiver format can comprise converting from multicast to broadcast and vice versa, multicast to unicast and vice versa, and unicast to broadcast and vice versa. The step of converting the packet from a sender format to a receiver format can further comprise storing in at least one field in the packet a copy of each of the destination addresses in the packet identified in step (b) as requiring conversion, each stored destination address being in the sender format; and converting the destination addresses of the packet identified in step (b) as requiring conversion from the sender format to the receiver format.

In addition, after the converted packet is received at a destination address, steps (a) through (d) can be repeated at each destination address. This enables a packet to pass through different network segments and get converted at each one so that receivers at each segment can receive the packet. For example to send a packet from a multicast sender to a multicast receiver, it might be necessary to route the packet through a portion of the network that is not multicast enabled. Thus, the sender would send a packet having a multicast announce address, the destination address(es) associated with the multicast announce address would get converted to a non-multicast format (e.g., unicast), and the packet is forwarded over the next network segment, then the converted packet would be received, and converted back to the multicast format, to be forwarded to the multicast receiver.

In another aspect, the invention features a method for sending packets over a computer network where the conversion of destination addresses from a sender format to a receiver format is dynamic, and can change depending on information in the packet from the sender or upon certain conditions occurring on the network. In one embodiment, this aspect of the invention features a method for sending packets over a computer network, comprising (a) receiving a first packet sent by a sender to at least one receiver, the packet comprising at least one parameter relating to a multicast announce address; (b) associating a predetermined forwarding rule set with the packet if the parameter has a defined value, the predetermined forwarding rule set responsive to the parameter and to senders and receivers on the network; (c) associating a dynamic session forwarding rule set with the packet that is responsive to the parameter, if the parameter has a defined value; (d) using the forwarding rules set to determine if any of the at least one destination addresses associated with the multicast announce address corresponds to a receiver having a receiver format that must be converted, the forwarding rules set defining when a packet should be converted from a sender format to a receiver format before forwarding the packet; (e) converting the packet from the sender format to the receiver format for each destination address identified in step (b) as requiring conversion; (f) forwarding the first packet to each of the destination addresses included in the packet; and (g) using the session forwarding rules set to determine whether any of the destination addresses associated with the multicast announce address in future packets sent from the sender correspond to receivers having a receiver format that must be converted.

Embodiments according to this aspect of the invention can include the following features. The predetermined forwarding rules set may be restored upon the occurrence of a specified condition, such as reaching a predetermined limit for a parameter selected from the list consisting of session timeout, time limit, content size, content rate, hop count, and forwarding limit. The session forwarding table can be deleted when sending of packets over the computer network in accordance with the multicast announce address is complete. In addition, the packet from the sender can include a data transfer multicast address or port information, such as a UDP port, which can modify the forwarding rules set. Further, the packet from the sender can include information related to the size of additional packets to be sent from the sender or the rate at which additional packets will be sent, which each may impact a forwarding rules set.

In still another aspect, the invention features a system for sending a packet over at least one computer network, comprising: (a) at least one sender, the sender sending packets over the computer network in a sender format; (b) at least a first receiver in communication with the sender and receiving packets in a receiver format; and (c) a first server in communication with the at least one sender and the first receiver, the first server configured with a first forwarding rules set defining when a packet sent by a sender must be converted from a sender format to the first receiver format before being forwarded to the first receiver.

Embodiments according to this aspect of the invention can include the following features. In one embodiment, the first server can comprise a packet relay server. In another embodiment, the forwarding rules set defines when a packet must be converted based on at least one parameter included in the packet, such as a source address or destination address. In another embodiment, the system can comprise a second server in communication with the first server and with at least a second receiver, the second server being configured with a second forwarding rules set defining when a packet sent to the second server must be converted from a sender format to a receiver format before being forwarded to the second receiver. In still other embodiments, the invention can comprise any number of additional servers, each configured with a forwarding rules set.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. The drawings are not necessarily to scale, emphasis instead being placed on illustrating the principles of the present invention.

FIG. 5 is a forwarding table used in connection with sending packets over a computer network, in accordance with one embodiment of the invention.

DESCRIPTION

The present invention provides an easy to use, easy to set-up, and transparent tool for making segments of a network in one format appear to be a segment of a network in another format. For example, in one embodiment, the present invention can make unicast only network segments appear to be multicast enabled. In one embodiment, this is achieved by converting a packet in one format receives or intercepted at a server (e.g., a multicast packet) into any number of packets of another format (e.g. unicast packets) that are then transmitted through the differently formatted network (e.g., the unicast network) to the destination hosts or destination addresses. Because this conversion is accomplished using a formatting rules set (or formatting table) this conversion is transparent to the sending host. In addition, because this conversion is accomplished through software resident on the application layer of the network, it does not require reconfiguration of the network.

Figure 1:
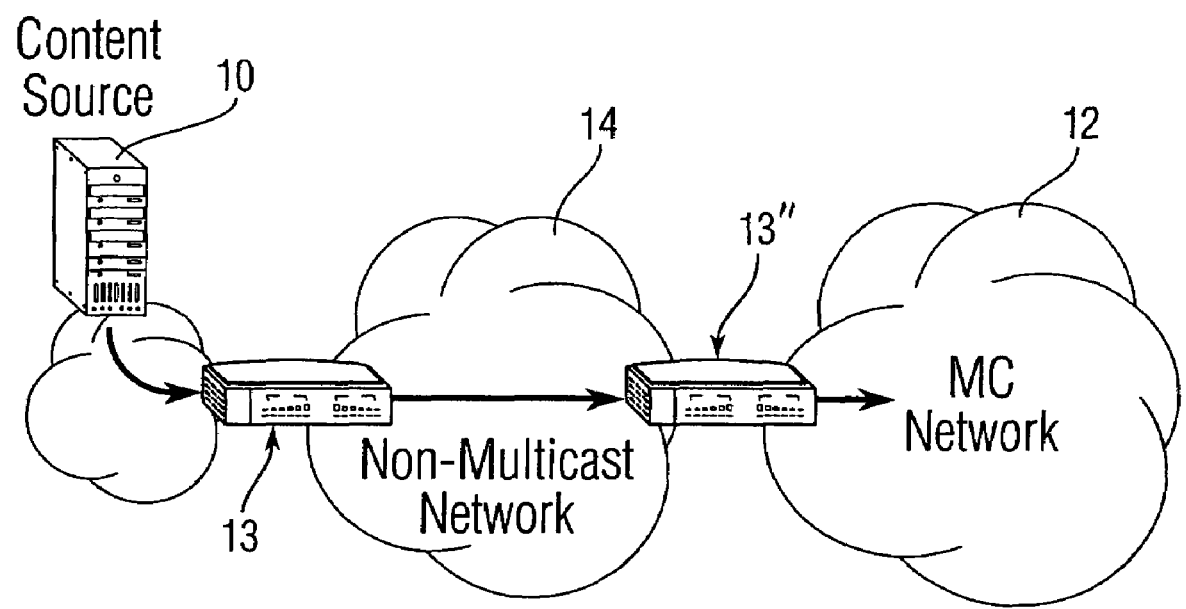
FIG. 1 is a simplified diagram of a prior art physical configuration that requires a content source to send data over a non-multicast network.
Figure 2:
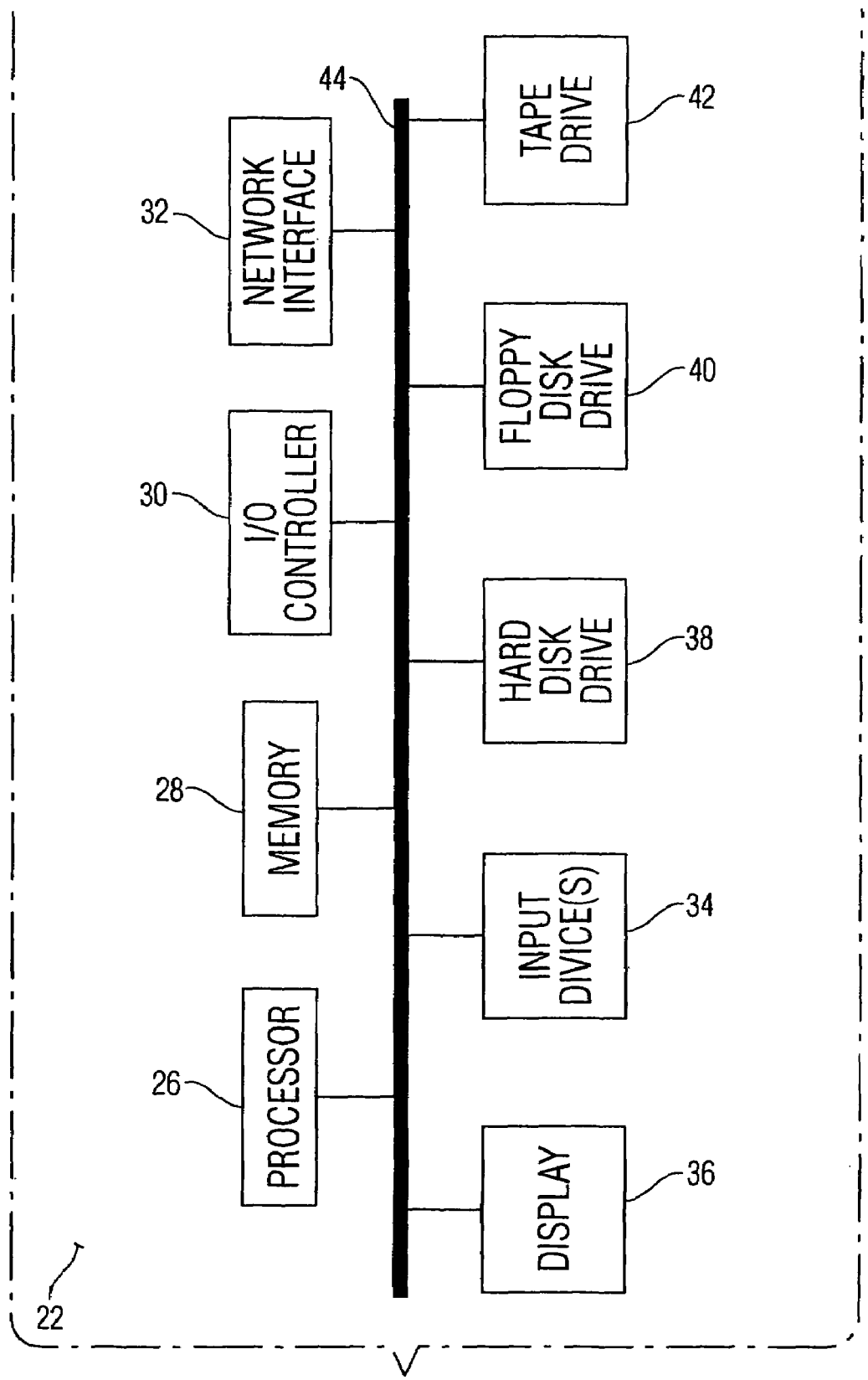
FIG. 2 is a simplified block diagram of a computer system in which at least a portion of the present invention can be embodied.
Figure 3:
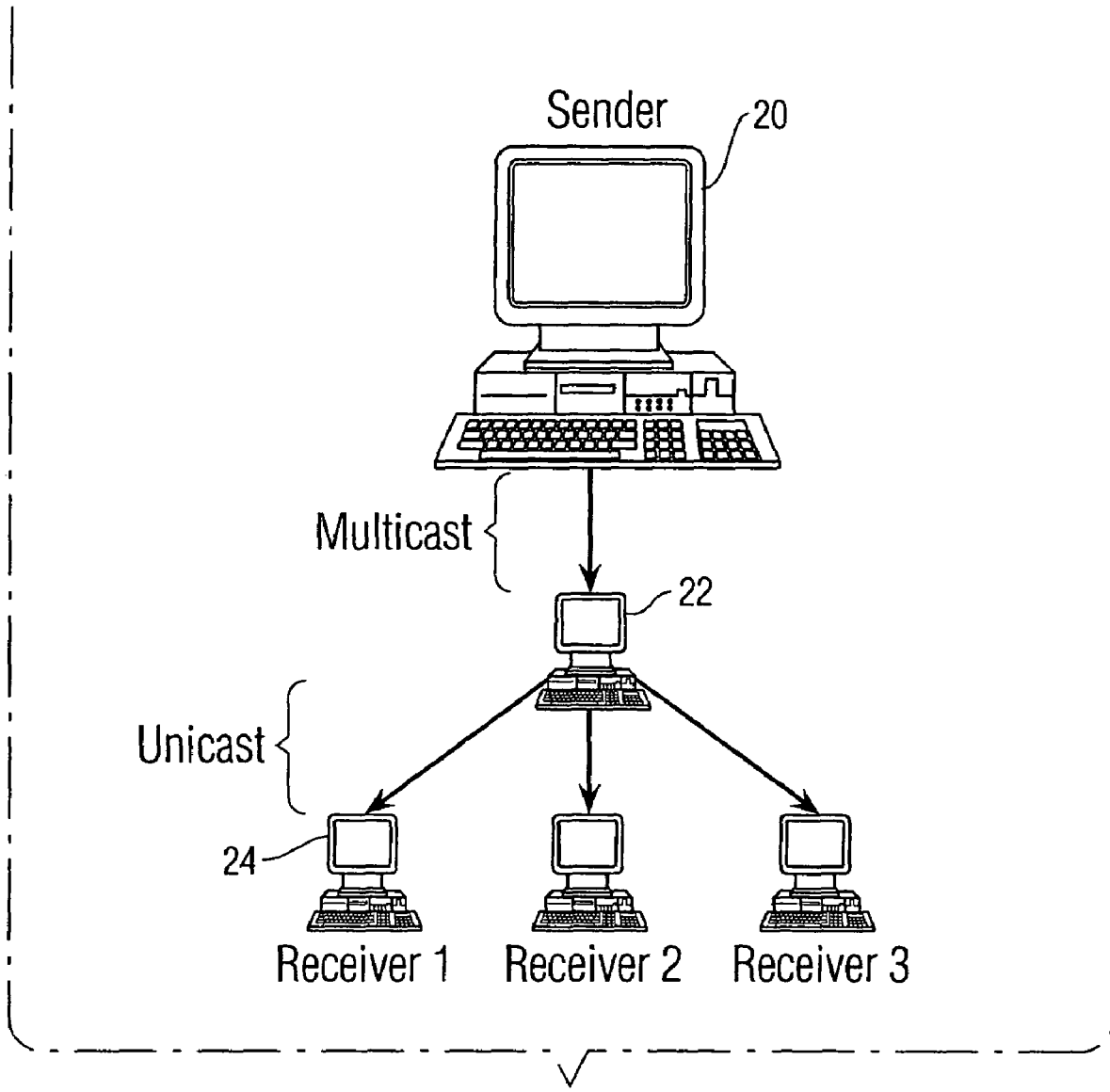
FIG. 3 is a simplified diagram of an embodiment of a computer network in which at least a portion of the present invention can be embodied.

FIG. 2 is a simplified block diagram of a computer system in which at least a portion of the present invention can be embodied, and FIG. 3 is a simplified diagram of an embodiment of a computer network in which at least a portion of the present invention can be embodied. The sender 20, server 22, and receivers 24 can be computers, such as PCs or workstations, running any one of a variety of operating systems. The server 22 can further comprise packet-forwarding software that operates in connection with the systems and methods of the present invention (described herein). That is, software embodying the present invention will, in one embodiment, reside in an application running on server 22.

Referring to FIG. 2, the server 22, regardless of what type of computer it is, typically includes a central processor 26, a main memory unit 28 for storing programs and/or data, an input/output controller 30, a network interface 32, one or more input devices 34 such as a keyboard and a mouse, a display device 36, a fixed or hard disk drive unit 38, a floppy disk drive unit 40, a tape drive unit 42, and a data bus 44 coupling these components to allow communication there between. In addition, each sender 20 and receiver 24 generally includes all or some of the components included in the server 22 as shown in FIG. 2.

In some embodiments, one or more computer programs define the operational capabilities of the server 22, and its clients, such as sender 20 and receivers 24. The programs can be loaded into the server 22, the sender 20, and the receivers 24 via the hard drive 38, the floppy drive 40, and/or the tape drive 42. Alternatively, the programs can reside in a permanent memory portion (e.g., a ROM chip) of the main memory 28. In some other embodiments, the server 22, sender 20 and/or the receiver 24 can include specially designed, dedicated, hard-wired electronic circuits that perform all functions described herein without the need for instructions from computer programs. The invention can be used, for example, to load quickly and reliably new revision levels of the client software electronically from the server onto one or more of the clients.

In one embodiment, the present invention provides a way for a server 22 to act in a network configuration as a delivery node. In this embodiment, when the present invention configures the network so that the server 22 acts as a delivery node, the server 22 receives a packet in one format and converts it into a packet in another format, which is then forwarded to the destination addresses in the packet. For example, in one embodiment, the server 22 receives a packet stream (unicast, broadcast, or multicast) from a sender 20 and converts it into the necessary type of data stream (unicast, broadcast, or multicast) for delivery to one or more receivers 24 reachable from the server 22.

Referring again to FIG. 3, in this embodiment, the sender 20 (which may be a multicast sender, such as an MFTP sender) has receivers 24 ($R_1$, $R_2$, and $R_3$) that reside on a unicast-only portion of the network. In accordance with this embodiment of the invention, the server 22 receives the multicast data stream from the sender and converts it into multiple identical unicast streams for delivery to the unicast receivers $R_1$, $R_2$, and $R_3$. In this embodiment, the server 22 is able to receive the multicast traffic of sender 20, but the receivers 24 cannot. In another embodiment, traffic (e.g., packets) sent by a receiver 24 to a sender 20 (such as a multicast sender) always is unicast. In that embodiment, the packet forwarding system of the invention is not involved in the reverse packet flow. Combinations of unicast, broadcast, and multicast transfers can be used to utilize the network bandwidth as efficiently as possible.

It should be understood that, although the packet forwarding system of the invention is illustrated in FIG. 3 as being located on a server 22 on a computer network, it may be located logically anywhere on the network between a sender 20 and one or more receivers 24. Moreover, in one embodiment, the present invention may comprise a software program running on any host connected to the network. In another embodiment, the present invention may comprise one or more hardwired circuits configured to operate as described herein. However, because it is an object of the invention to provide a simple, low risk way to configure a computer network to provide a "multicast-like" functionality (without having to implement multicast), it generally is preferred that the present invention be implemented in software. In addition, in one embodiment, the invention is implemented in the application layer (layer 7) of the Open Systems Interconnection (OSI) model. The application layer contains signals that perform useful work for the user, such as file transfer or remote access to a computer, in contrast with lower levels, such as the network level 3 (in which tunneling typically is implemented), which control the exchange of data between a transmitter and receiver.

Figure 4:
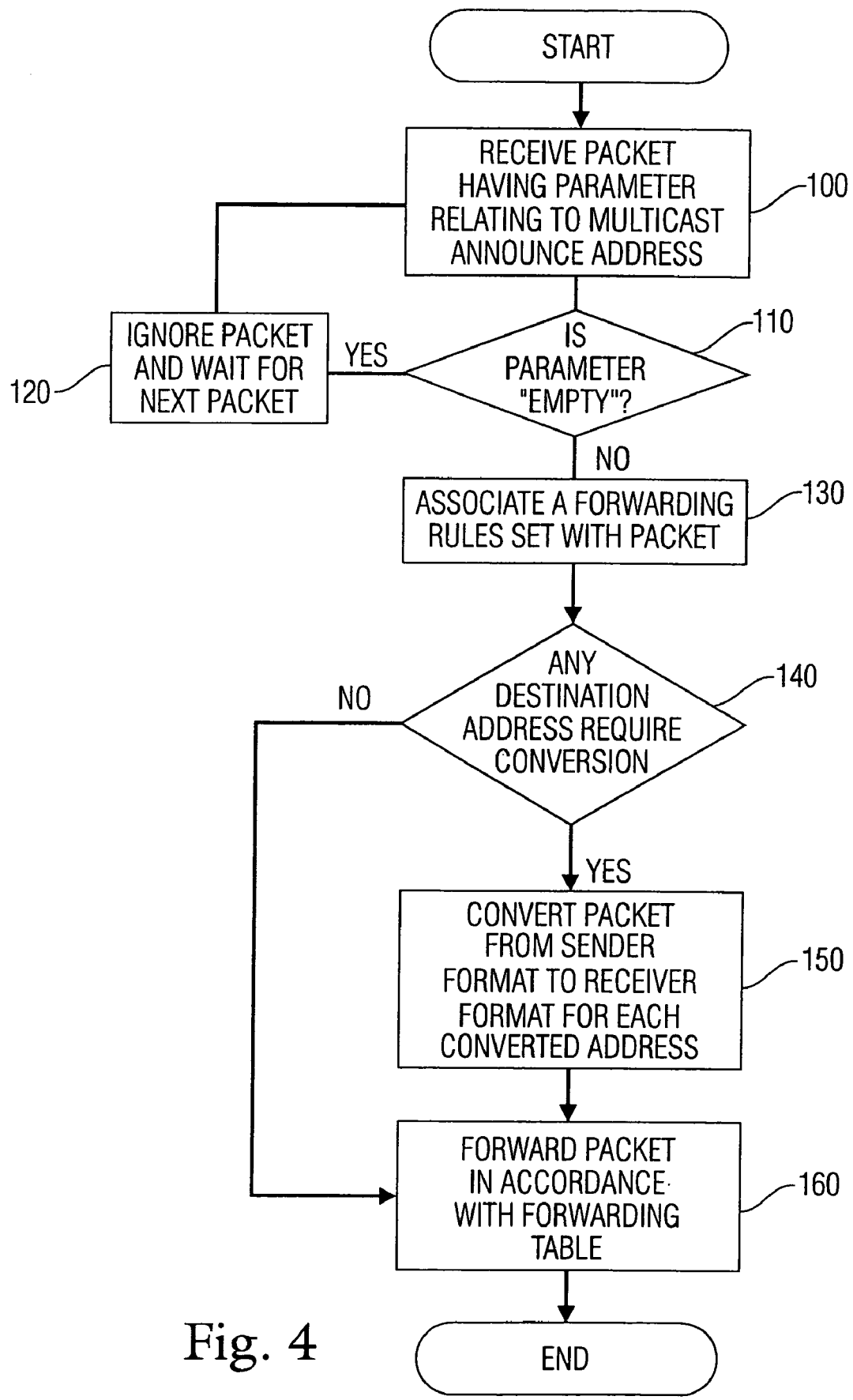
FIG. 4 is a flow chart of a system for sending packets over a computer network, in accordance with one embodiment of the invention.

FIG. 4 is a flow chart of a system for sending packets over a computer network, in accordance with one embodiment of the invention. When a packet is received (step 100), a predetermined parameter in the packet is checked to determine if it has a value stored in it (that is, does the packet have any information in that field relating to a multicast announce address). If the field is empty, the packet is ignored (step 120) and the system waits for the next packet. If the parameter is not "empty," a forwarding rule set is associated with the packet (step 130). Next, the packet is checked to determine whether any destination addresses in the packet require conversion to a format different from the format with which the packet was sent. This determination may be accomplished in several ways.

In one embodiment of the invention, a forwarding table, such as the one illustrated in FIG. 5, helps to determine whether a destination address associated with the parameter must be converted. For example, if the parameter corresponded to a multicast announce address, the destination addresses of members of the corresponding multicast group would be checked. In another embodiment, a set of forwarding rules may be used to make this determination. In other embodiments, a set of linked lists, one or more matrices, a decision tree structure, a database, or other organizational means known to those skilled in the art may define the forwarding relationships.

In one embodiment, the forwarding table may comprise lists of destination addresses and corresponding routing information relating to that address. Because packets typically comprise a transmission unit having both data and a header containing an identification number, source and destination addresses, and sometimes error control data, any of this information may be used, in addition to the parameter relating to a multicast announce address, accordance with the invention, to configure a forwarding rules table.

Referring to FIG. 3, a forwarding rules table, such as that illustrated in FIG. 5, could be stored on the server 22 and would, in accordance with one embodiment of the invention, list the multicast group address and the addresses of the receivers 24. The forwarding rules table may further indicate that the sender 20 is on a multicast-enabled portion of the computer network, but that the receivers 24 are on a unicast portion of the network. The computer network may include other receivers 24 (not shown) that are on a multicast enabled part of the network.

For example, a forwarding rules set for FIG. 3 may indicate that messages sent from the sender 20 to a multicast announce address must be converted from multicast to unicast to be able to be sent to the receivers 24 ($R_1$, $R_2$, $R_3$) In addition, the forwarding rules set may further indicate that certain addresses, such as those of receivers 24 that are on multicast portions of the network (not shown), do not require conversion.

Referring again to FIG. 5, it is seen that this forwarding rules table shows that for Group_A, some of the receivers (i.e., Receiver_1 and Receiver_5), already are multicast enabled. Thus, for packets forwarded to these destination addresses, no conversion is necessary if the sender is a multicast sender. However, for the other receivers listed in the table, the forwarding table indicates that certain format conversions are necessary.

It should be understood, however, that specific parameters that a sender may add to the header can also be used to determine whether or not to convert. In some embodiments, a determination may be made based on the data in the packet. In another embodiment, the determination may be made based on the respective protocols in the sender and the receiver. In still other embodiments of the invention, parameters can be added to packets and/or messages sent from a sender that help to determine whether and how a packet will be forwarded. These parameters are discussed more fully below.

Referring again to FIG. 4, for the destination addresses in the packet that require conversion (step 140), the packet is converted from a sender format to a receiver format for each destination address that requires conversion (step 150) and then forwarded in accordance with the forwarding table (step 160). The received packet is also forwarded to those destination addresses not requiring conversion (steps 140 and 160).

The conversion can be accomplished in many different ways within the scope of the invention. For example, in one embodiment, a packet having a multicast address is received, and a forwarding table in the server 22 (see FIG. 3) determines that the multicast address in the packet corresponds to a list of unicast addresses. The server 22 then replicates the multicast packet and sends it to each unicast address on this list. In another embodiment, each packet sent in this manner to a unicast address comprises a field in which a copy of the multicast address originally sent to the server 22 can be stored as a destination address. When the packet is received at the destination address, the stored multicast address in the unicast packets can be retrieved.

Figure 6:
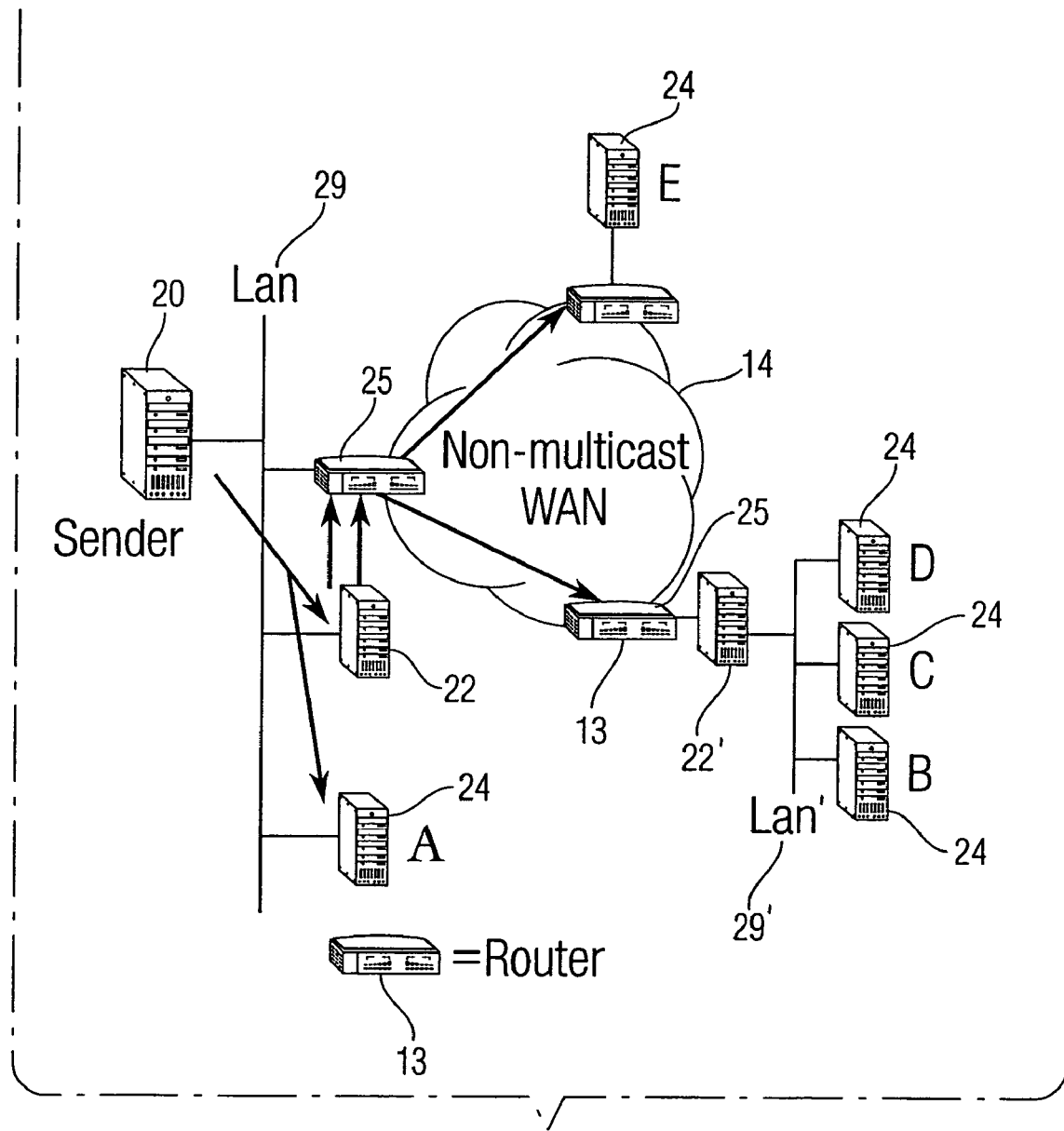
FIG. 6 is a simplified diagram of an embodiment of still another computer network in which at least portion of the present invention can be embodied.

FIG. 6 is a simplified diagram of an embodiment of still another computer network in which at least portion of the present invention can be embodied. FIG. 6 illustrates how the system and method of one embodiment of the present invention can work using networks that have both multicast enabled portions and non-multicast enabled portions. In FIG. 6, there are five remote receivers 24 (A, B, C, D, and E) that need to receive data from sender 20. These remote receivers 24 can, in one embodiment of the invention, comprise additional servers, but are not necessarily the same as the server 22 referred to herein. The remote receivers 24 reside in different parts of the network. In addition, by way of example only, the non-multicast network 14 (the WAN 14) is illustrated to be a unicast network. However, it should be understood that the embodiment of FIG. 6 is applicable to any non-multicast type of network. Also by way of example only, in FIG. 6, the remote receivers labeled D, C, and B reside on a multicast portion of the network. The receiver 24 labeled A is on the same LAN 29 as the sender 20. Thus, A can be reached directly via multicast from sender 20.

The first server 22 (sometimes referred to as a "Fan-out" server or a "Packet Relay" server) also is on the same LAN 29 (labeled as LAN and not LAN') as the sender 20 (i.e., the LAN. Thus, the first server 22 receives from sender 20 the multicast packets to the multicast addresses to which the server 22 is configured (e.g., with a forwarding rules set or forwarding table). In turn, the server 22 replicates an incoming packet from sender 20 two times with different destination addresses that are unicast addresses: one to the remote receiver 24 labeled "E" and one to another server 22'. The server 22' receives the incoming packet from server 22. At server 22', the incoming packet is converted back to a multicast format (the format of the receivers 24 local to the server 22') from a unicast format (the format of the sender that sent the packet, which was the non-multicast WAN 14). The packet is then forwarded from the server 22' to the group multicast address (not shown). From the group multicast address, the packet is forwarded over the multicast enabled LAN 29 labeled LAN', to remote receivers 24 labeled B, C, and D. Because the WAN 14 is not multicast enabled, this embodiment of the invention permits the computer network of FIG. 6 to transmit unicast when required and multicast when possible, providing virtually all of the benefits of a fully multicast ready network.

Figure 7:
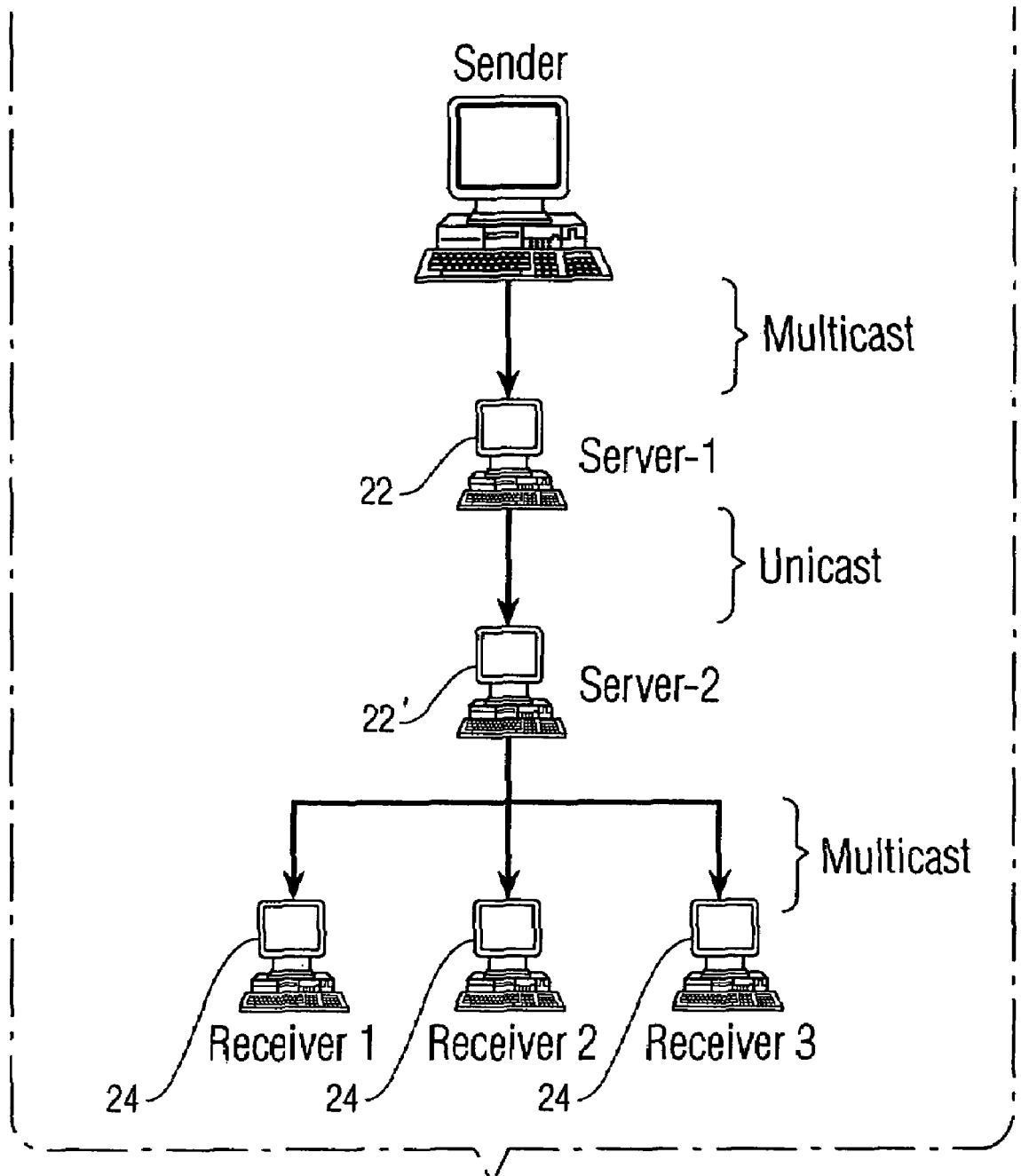
FIG. 7 is a simplified diagram of an embodiment of a computer network in which at least a portion of the present invention can be embodied.

FIG. 7 illustrates another example of how the present invention may be used to transmit multicast packets over non-multicast parts of the network. In FIG. 7, the server 22 is acting as a distribution node, and the server 22' is acting as a delivery node. When acting as a Distribution Node, the server 22 receives a packet stream from sender 20 and forwards it to one or more other servers, such as server 22', where the packet is converted as necessary for delivery to local receivers 24. As illustrated in FIG. 7, this may occur when a multicast sender 20 has receivers 24 that reside on a multicast section of the network that is separated from the local multicast segment by a unicast-only segment (see FIG. 3). The server 22 receives the multicast data stream (in a packet form) from the sender 20 and converts it into a unicast stream for transmission to the second server 22'. Upon arrival at the second server 22', the unicast stream is converted back into a multicast stream for delivery to the multicast-enabled receivers 24. For delivery to the receivers 24, the original multicast address (sent in the packet from sender 20) is used by the second server 22'. In other embodiments of the invention, many tiers of servers 22 may be used in this way to transport data through the network.

Figure 8:
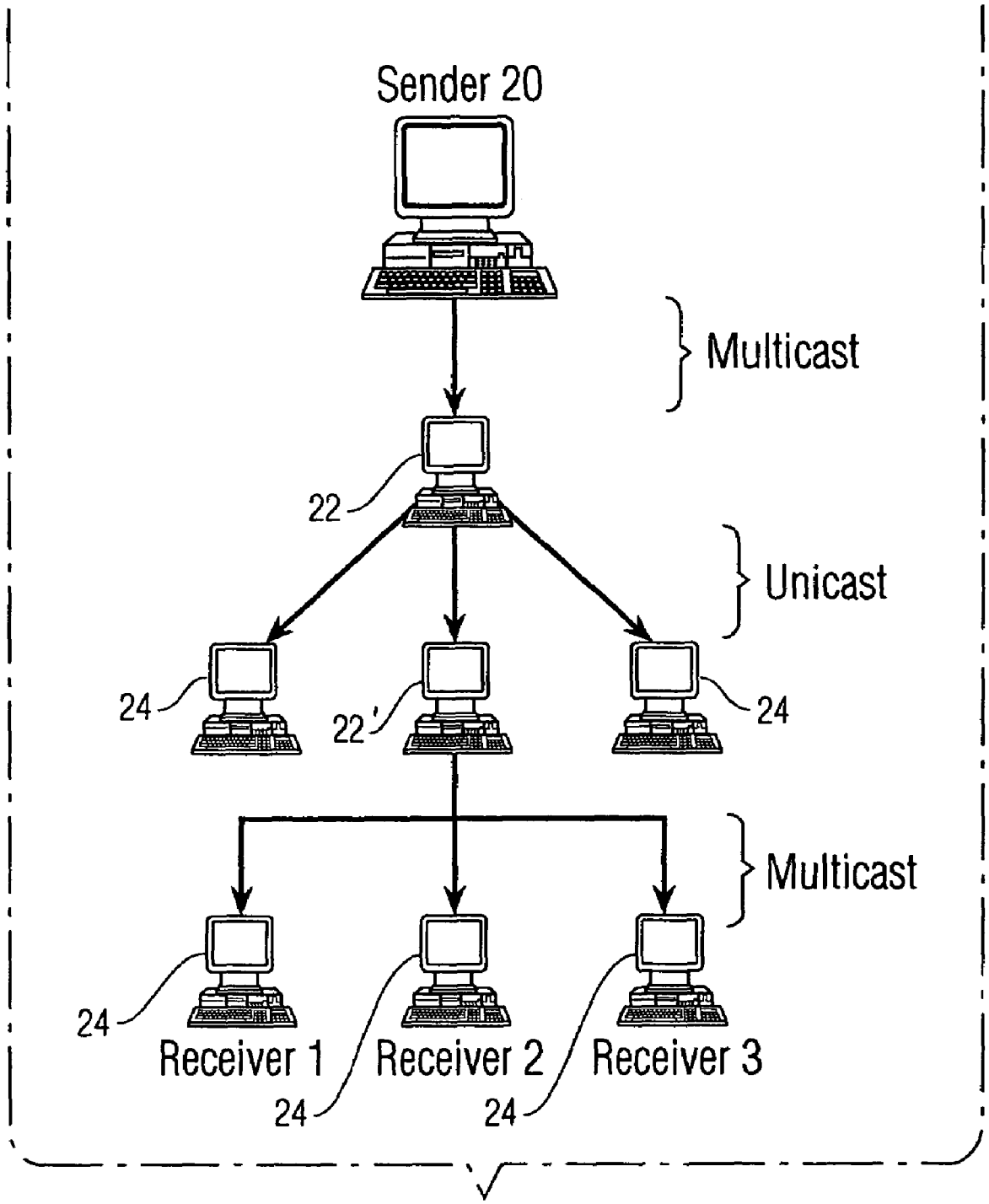
FIG. 8 is another simplified diagram of an embodiment of a computer network in which at least a portion of the present invention can be embodied.

Referring to FIG. 8, a server 22 configured in accordance with one embodiment of the invention may perform both distribution and delivery functions at the same time. In this example, the first server 22 is delivering the data stream sent by sender 20 to its local receivers 24 (Receiver 1 and Receiver 2) as unicast streams. In addition, the server 22 distributes the unicast stream to the second server 22', which converts the unicast stream to a multicast stream then delivers the multicast stream to a second set of receivers 24 (i.e. Receiver 2, Receiver 3, and Receiver 4).

In another embodiment of the invention, the system and method for sending packets over a computer network also may incorporate features to reduce or prune the number of packets that must be sent over the network. In this embodiment, data is delivered and/or distributed based on information contained in the packet itself. For example, in one embodiment, a multicast protocol header and a configuration file provided by the user provide information that a server will use to filter the packet data. This can prevent the excessive header overhead found in tunneling approaches.

In another embodiment of the invention, a server will only send multicast traffic in a forward direction (sender to receiver). This includes, in one embodiment, Announce, Status Request, Completion, Data, Echo, and Abort types of packets in a multicast protocol such as the MFTP protocol. Administrative back traffic (receiver to sender) is unicast. As such, back-off delays, and other MFTP back-traffic features, are not impacted.

Different embodiments of the invention can use one or more of the following filtering techniques (described below) to reduce traffic on the network:
1. loopback—drop packets with a source address that matches the address of the server or other receiver
2. neighbor blocking—do not forward a packet back to a neighbor that has just sent the packet.
3. relay hop count—limits the number of servers through which a packet is allowed to travel.
4. multicast loopback—tag any, multicast packet that a server forwards. A server does not forward a multicast packet, if it is tagged as already having been forwarded. (although network loop-topologies are permitted in some embodiments of the invention)

In one embodiment of the invention, four parameters to support the filtering feature are added to the standard multicast sender-transmitted messages (which, in one embodiment of the invention, are Announce, Status request, Data, Completion, Abort, and Echo). The parameters added are destination address, destination port, hop count, and "was forwarded". Combinations of these values determine where in the server network the transmitted packet is. On the originating network (the one the sender resides on), the hop count may be set to a preconfigured value and the "was forwarded" parameter can be set to false ("F"). This is the original setting a sender would make before transmitting a packet, in accordance with one embodiment.

The first step at minimizing traffic uses filtering. A server, in one embodiment, discards packets with a source address that matches the server's address, which could indicate that the packet was forwarded by that sender. In another embodiment, the server will not forward a packet back to a neighbor (e.g., another server or a sender that is local to the server) that has just sent a packet to the server.

Another embodiment of the invention attempts to prevent another type of looping called multicast looping. Multicast looping is the re-distribution of a packet that has already been multicast. This could occur if two or more servers reside on the same multicast enabled network, and are listening for the same multicast address and port combinations. To prevent this, the was forwarded value in the packet is set to true ("T") just before a packet is re-multicast by a server. Thus, in accordance with this embodiment of the invention, the server will discard any packet that has the "was forwarded" value set to true.

Still another embodiment of the invention provides a way to prevent distribution looping. Distribution looping is a unicast loop between two or more servers. The use of filters and a "hop count, in accordance with this embodiment of the invention, can reduce this type of traffic. For example, suppose server A forwards packets to server B. In addition, suppose server B forwards packets to server A. There would be an endless looping of the same packet between servers A and B. In addition, this packet would be re-multicast by A and B each time it was forwarded. To limit this, in accordance with one embodiment of the invention, a hop count value may be used which is set to zero at the sender. The packet hop count is incremented each time a packet is received by a Packet Relay. The packet is discarded if the packet hop count reaches the limit. In one embodiment of the invention, the default hop count may be set to 16 hops. The hop count is also used to set the maximum depth for a hierarchical distribution design. Thus, for a maximum hop count of 16 hops no more than 16 levels could be forwarded.

Note that, in another embodiment of the invention, hop count could be set to the limit at the sender and decremented by servers, such that a discard of the packet would occur when zero is reached. This is similar to the approach used by the IP hop count used in TCP/IP for use by routers. Incrementing the hop count as described herein, in one embodiment, may require that every server needs to be configured with this parameter. However, this approach may, in some instances, have some benefit based on the particular server's position in the network. For example, servers at the "edge" of a network may have higher hop count numbers than those close to the sender. Decrementing hop count means, in some embodiments, that the configuration of the hop count limit is only configured in the sender. There are thus benefits to both techniques.

Figure 9:
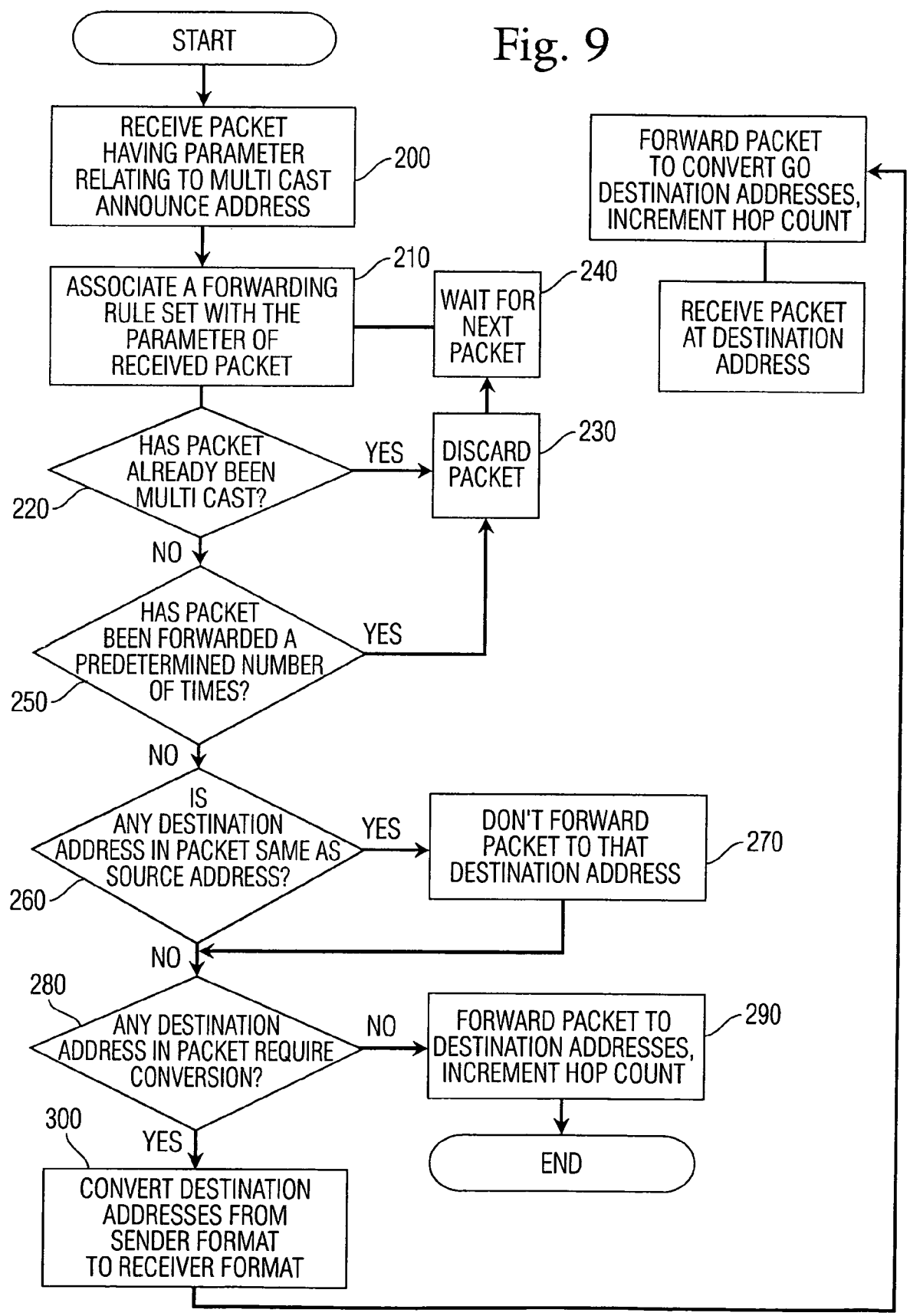
FIG. 9 is a flow chart of a system of sending packets over a computer network, in accordance with an embodiment of the invention.

FIG. 9 is a flow chart illustrating how some of the filtering techniques described above may be implemented in one embodiment of the invention. For purposes of example only, in this embodiment, it is assumed that the packets received have parameters relating to a multicast announce address, and that these parameters are not "empty" (as discussed previously in connection with FIG. 4). As in some of the previously described embodiments, a forwarding rules set is associated with the parameter relating to multicast announce addresses in the received packet (step 210). Thus, the received packet (step 210) triggers a distribution and address function. First, the packet is been checked to determine if it has been multicast by another server (step 220). If it has, the packet is discarded (step 230), and the system waits for the next packet to arrive (step 240).

Packets to be forwarded will then have their hop count examined. This is done, in this embodiment, by checking to see if the packet has been forwarded a predetermined number of times (step 250). In one embodiment of the invention (not shown), the hop count may be incremented as soon as the packet arrives. In another embodiment, corresponding to FIG. 7, the hop count is incremented as it actually is forwarded. The packet will be forwarded, in this embodiment, if the hop count is less than the limit. For example, the packet may be multicast if the hop count is less than the limit— therefore, re-multicasting is not required. If the hop count limit is reached, the packet is discarded (step 230) and the system waits for the next packet to arrive.

Although not illustrated in FIG. 9, in another embodiment of the invention the packet being forwarded and/or multicast may have a "was forwarded" field (as described above) set to "T" (true, which indicates that the packet has been forwarded. In this instance, the packet would be discarded in a manner similar to the discarding of the packet described above. This will prevent the packet from being forwarded to another server, thereby helping to reduce network traffic.

Next, the packet is checked to determine if any of the destination addresses in the packet are the same as the source address of the packet (step 260). If they are, the packet will not be forwarded to those destination addresses (step 270).

Next, the packet is checked to determine if any of the destination addresses require conversion (for example, whether the destination address in a sender address format must be converted to a destination address in a receiver address format) (step 280). If no destination addresses require conversion, the packet can be forwarded to the destination addresses, and the hop count is incremented (step 290). If, however, there are destination addresses that require conversion, then the system converts them. Next the converted packet is forwarded and the hop count is incremented (step 320).

The entire cycle, may then be repeated. This continues until the packet is discarded (for the reasons discussed above) or until there are no destination addresses requiring conversion (step 290).

In the embodiments of the invention described above, the forwarding tables and/or forwarding rules sets were statically configured. That is, the forwarding tables in these examples are configured for a superset of potential receivers of a sender's packet (e.g., potential group members). For example, in one embodiment of the invention these forwarding tables would correspond to receivers always jointed to a multicast address to receive announce messages. However, because announce packets may convey information to this superset of receivers about the session, such as group members (closed group and open limited groups), content size to be transmitted, transmit rate, multicast address for data transfer, and session time limit, these parameters can be used, in other embodiments of the invention, to reconfigure the forwarding tables as packets are being sent over the network.

In one embodiment, a server listens to the announce packets sent by a sender to gather information that can be used to dynamically configure the forwarding tables applicable to that session's data transfer for the packet relays in the network. For example, a server can listen to the address list, data transfer multicast address and UDP port, content size and rate, and session timeout and use some or all of this information to create reduced forwarding tables to include only those specified for the session.

For example, suppose 100 different receivers initially are configured to receive information from a multicast sender. These receivers may be on many different WANs and LANs, such that some are multicast, some are unicast, some are broadcast, etc. However, suppose that an the announce packet from the multicast sender is being sent to a subset of these 100 receivers, such as 10 receivers. The announce packet will contain an address list with this information. Without dynamic reconfiguring of the forwarding table, the packet will be converted (if necessary) and forwarded to all receivers at the multicast address. This is done because the server initially was configured with this information. When the receivers get the packet, those receivers not on the list contained in the packet will simply ignore the packet. However, this forwarding can create needless traffic on the networks.

Rather than forwarding the packet to all 100 receivers (with the associated format conversions that go with the forwarding), with the dynamic forwarding table embodiment of the invention, the server will "listen" to one or more of the address list, data transfer multicast address and UDP port, content size and rate, and session timeout, and use this information to create reduced forwarding tables to include only those specified for the session. In one embodiment of the invention, these modified forwarding tables are deleted. This means that data will not be delivered on links with no participants, providing the same kinds of benefits multicast enabled networks provide. In another embodiment of the invention, the originally configured forwarding table can be restored if the server detects certain conditions on the network, such as seeing that all receivers have sent messages to the sender indicating that all data has been received.

Figure 10:
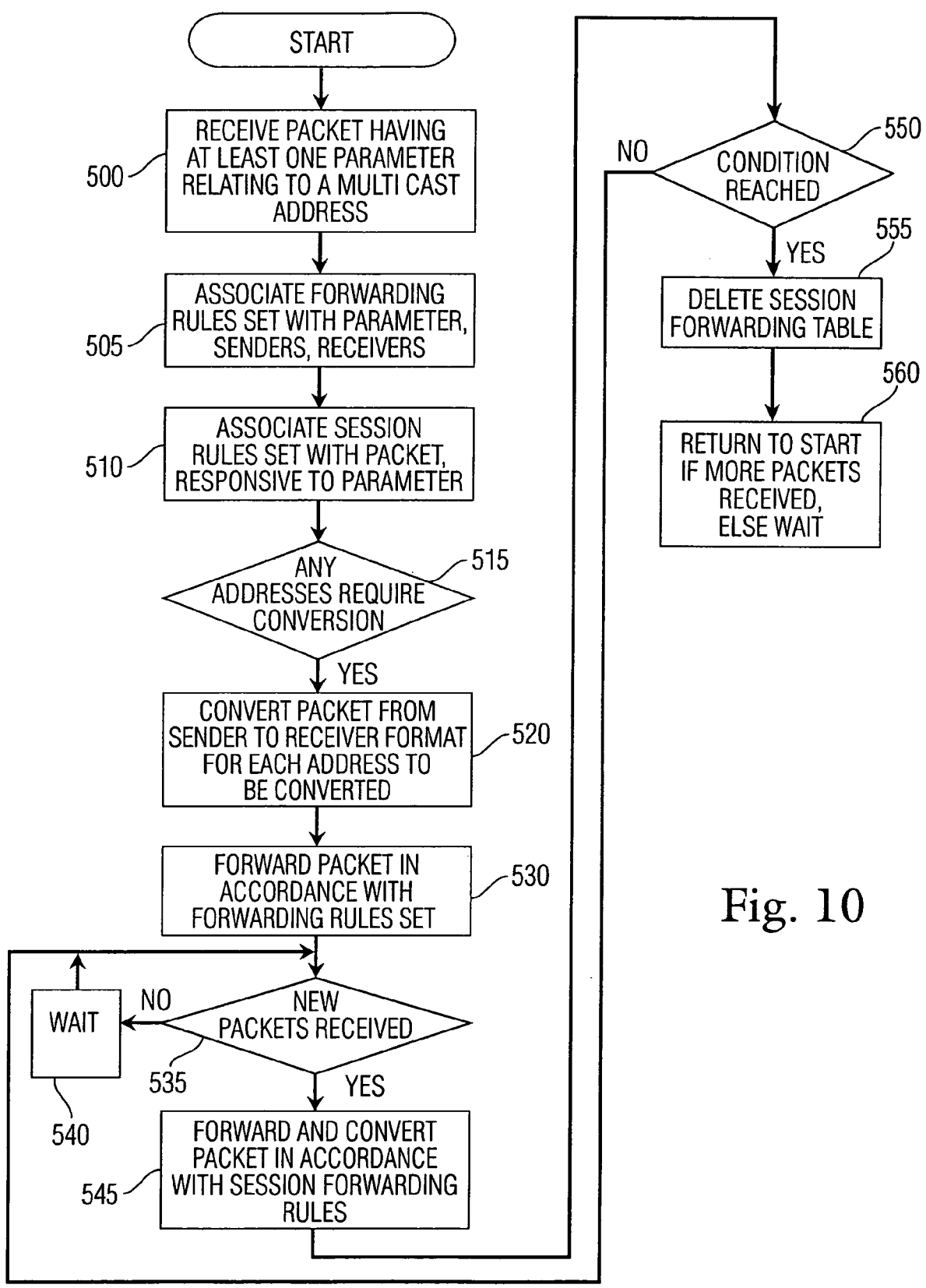
FIG. 10 is a flow chart of a system for dynamically sending packets over a computer network, in accordance with an embodiment of the invention.

FIG. 10 is a flow chart, in accordance with one embodiment of the invention, for implementing a dynamic forwarding table. When a packet is received having at least one parameter relating to a multicast address (step 500), a forwarding rules set is associated with the packet (step 505) and a session rules set is associated with the packet (step 510). The forwarding rules set is used, in one embodiment of the invention, to send out an announce message, such as an invitation to join a multicast group (as explained above).

The session rule set is configured based on information in the packet and is used for subsequent packets sent by the sender to the receiver. For example, the session rule set may be configured to comprise only those receivers listed in a parameter in the packet corresponding to a host list. In another embodiment, the session rule set may be configured based on several different pieces of information, such as the content size and the rate at which it can be sent. This information is used, in one embodiment, to calculate a session timeout defined by the session rule set. The session timeout may be used to determine how much time a system will allocate to forwarding content from a sender to a group of receivers.

In other embodiments of the invention, different combinations of other parameters, such as data transfer multicast address, UDP port, session timeout, address list, and the like, may be used to configure a session rule set. In one embodiment the session rule set is automatically deleted when a session is complete. In another embodiment, such as that illustrated in FIG. 10, the session rule set is used until a predetermined condition is reached (step 550). For example, this condition may comprise reaching a time limit (such as a session timeout limit), detecting on the network that all receivers have acknowledged receiving data, detecting on the network that no packets have been received for a specific time, and the like. When the session table is deleted (step 555), the system typically will return to restoring a forwarding table (step 500) based on information in new packets that are received.

In some embodiments of the invention, the configuration of the server with the "default" or "static" configuration described above is done manually upon startup. In other embodiments of the invention, however, this initial configuration may be made automatically. This not only makes initial setup easier, but also automatically changes configuration as the network and groups of hosts change. It additionally provides automatic reconfiguration in case of a failure of the server.

The systems and methods of the invention described in connection with the embodiments described herein have application beyond the conversion of packet formats. For example, the systems and methods of the present invention would be useful to do protocol conversion, such as converting information from a TCP protocol to a UDP protocol. This could be done within the context of using a reliable multicast protocol, such as the MFTP protocol. For example, a packet stream sent in a multicast protocol could be converted to a plurality of packet streams in a TCP protocol, in manner similar to the multicast to unicast conversions described herein. This feature would be advantageous in computer networks where a sender wants to send information through a firewall (which at this time does not let UDP information past it).

Variations, modifications, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A method for forwarding packets over a computer network, wherein routing of individual forwarded packets is coordinated at the application layer of at least one server coupled to the computer network, the method comprising:
   receiving a first packet according to a multicast format, the first packet having individual fields that collectively include at least one of a multicast address and a parameter corresponding to the multicast address;
   examining the multicast address and based upon the multicast address, associating a forwarding rule set with the first packet, said associated forwarding rule set based on the multicast address, the forwarding rule set including a plurality of destination addresses corresponding to the multicast address; and
   for at least one of the plurality of destination addresses within the forwarding rule set,
      determining whether the first packet should be converted before being forwarded to the at least one destination address,
      if determined that the packet should be converted before being forwarded to the at least one destination address,
         converting the first packet into a second packet that is based on a unicast format of the at least one destination address, and
         forwarding the second packet to the at least one destination address via a unicast only network segment, and
      if determined that the packet should not be converted before being forwarded to the at least one destination address,
         forwarding an unconverted first packet to the at least one destination address.

2. The method of claim 1 wherein the second packet is configured to be fed forward only.

3. The method of claim 1 wherein the individual fields of the first packet further collectively include the plurality of destination addresses associated with the multicast address.

4. The method of claim 1, further comprising including an original destination address associated with the first packet in an individual header field of the second packet.

5. The method of claim 4, further comprising:
   receiving the second packet;
   converting the second packet into the first packet; and
   restoring the original destination address in a destination address field of the first packet.

6. The method of claim 5 wherein the original destination address comprises the multicast address.

7. The method of claim 1, further comprising discarding the first packet in response to the occurrence of at least one condition selected from the group consisting of the first packet having identical source and destination addresses, the first packet having already been multicast, and the first packet having been forwarded a predetermined amount of times.

8. A computer-readable storage medium having stored thereon, computer-executable instructions that, if executed by a computing device, cause the computing device to perform operations for routing a first packet received in a multicast format, the operations comprising:
   receiving the first packet, the first packet having individual fields that collectively include a first destination address and at least one of a multicast address and a parameter corresponding to the multicast address;
   identifying a second destination address associated with the multicast address;
   converting the first packet into a second packet corresponding to a unicast format associated with the second destination address;
   forwarding the second packet to the second destination address via a unicast only network segment; and
   forwarding an unconverted first packet to the first destination address according to the multicast format.

9. The computer-readable storage medium of claim 8 wherein the server is configured to route the first packet according to routing parameters that are coordinated at an application layer level.

10. The computer-readable storage medium of claim 8 wherein identifying the second destination address comprises using a forwarding table that associates individual destination addresses with individual multicast addresses.

11. The computer-readable storage medium of claim 8 wherein identifying the second destination address further comprises identifying individual destination addresses located in at least one of a header field and a data field associated with the first packet.

12. The computer-readable storage medium of claim 8 wherein converting the first packet into the second packet further comprises including the multicast address in an individual header field of the second packet.

13. The computer-readable storage medium of claim 8 wherein converting the first packet into the second packet further comprises restoring the multicast address in a destination header field of the second packet.

14. The computer-readable storage medium of claim 8 wherein the operations further comprise updating a forwarding parameter included in an individual header field of the second packet, the forwarding parameter corresponding to forwarding conditions associated with the first packet.

15. A packet forwarding system, comprising:
   a first server coupled to a second server via a unicast only network segment and also coupled to a network node,
   wherein the first server is configured to forward individual data packets by performing operations comprising:
      receiving a first packet in a multicast format having a corresponding multicast address;
      examining the multicast address and, based upon the multicast address, associating a forwarding rules set with the first packet based on the multicast address;
      converting the first packet into a second packet having a unicast format based on an individual destination address associated with the multicast address;

transmitting the second packet to the individual destination address via the unicast only network segment; and transmitting an unconverted first packet to a multicast network segment coupled to the network node.

16. A packet forwarding system of a computer, comprising:

means for receiving a first packet according to a multicast format, the first packet having individual fields that collectively include at least one of a multicast address and a parameter corresponding to the multicast address;

means for examining the multicast address and, based upon the multicast address, associating a forwarding rule set with the first packet based on the multicast address, the forwarding rule set including a plurality of destination addresses corresponding to the multicast address;

means for converting the first packet into a second packet that is based on a unicast format of a first individual destination address within the forwarding rule set;

means for forwarding the second packet to the first individual destination address via a unicast only network segment; and means for forwarding an unconverted first packet to a second individual destination address within the forwarding rule set corresponding to the multicast address.

17. A method performed by a computer for forwarding packets over a computer network comprising:

receiving a first packet according to a multicast format, the first packet having individual fields that collectively include at least one of a multicast address and a parameter corresponding to the multicast address;

examining the multicast address and, based upon the multicast address, associating a forwarding rule set with the first packet based on the multicast address, the forwarding rule set including a plurality of destination addresses corresponding to the multicast address;

converting the first packet into a second packet that is based on a unicast format of a first individual destination address within the forwarding rule set;

forwarding the second packet to the first individual destination address via a unicast only network segment; and forwarding an unconverted first packet to a second individual destination address within the forwarding rule set corresponding to the multicast address.

* * * * *

UNITED STATES PATENT AND TRADEMARK OFFICE
CERTIFICATE OF CORRECTION

| | | |
|---|---|---|
| PATENT NO. | : 7,710,961 B2 | Page 1 of 1 |
| APPLICATION NO. | : 10/957535 | |
| DATED | : May 4, 2010 | |
| INVENTOR(S) | : Miller et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 945 days.

Signed and Sealed this
Twenty-second Day of February, 2011

David J. Kappos
*Director of the United States Patent and Trademark Office*